Nov. 7, 1933.  H. S. CARLSON  1,933,965
TROUBLE LIGHT
Filed March 18, 1932
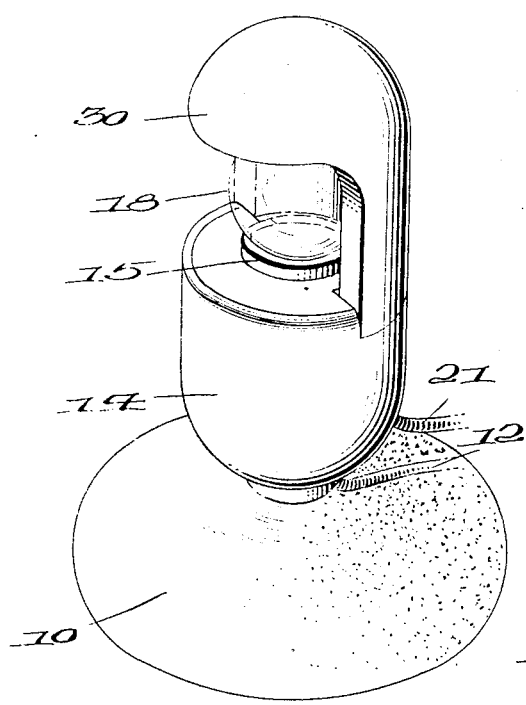
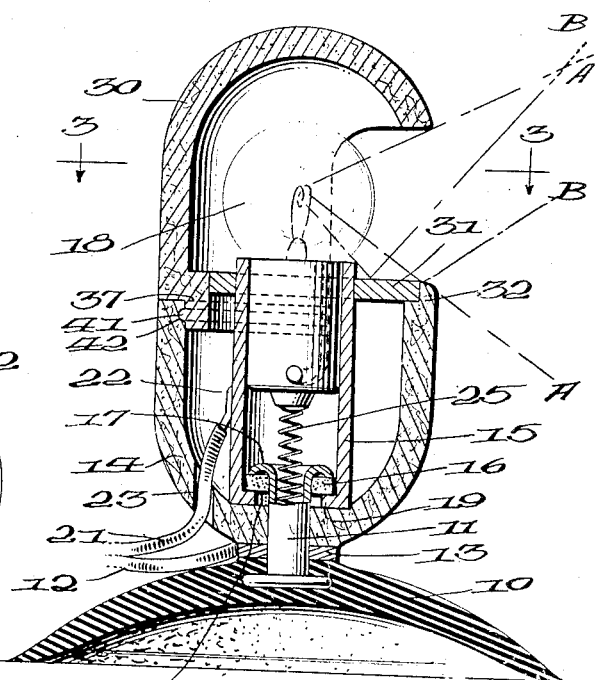
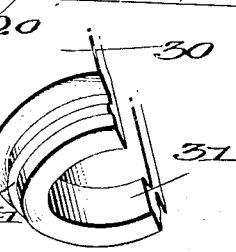
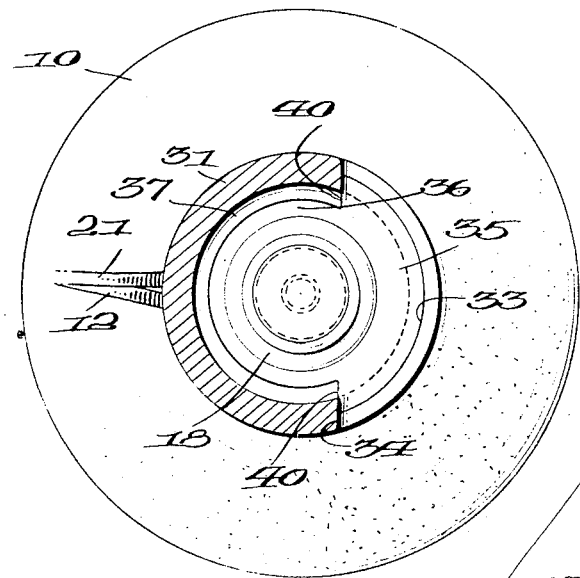
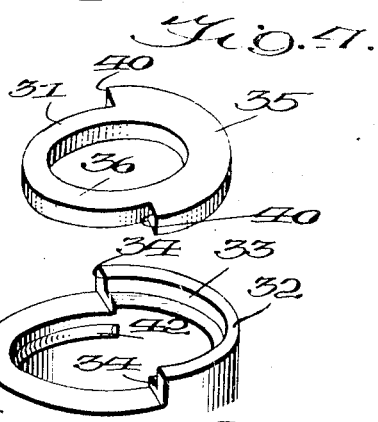
Inventor
Harold S. Carlson,
By Emery, Booth, Varney & Holcombe
His Attorneys Patented Nov. 7, 1933

1,933,965

UNITED STATES PATENT OFFICE 1,933,965

TROUBLE LIGHT

Harold S. Carlson, Arlington, N. J.

Application March 18, 1932. Serial No. 599,781

7 Claims. (Cl. 240—52.2)

This invention relates to portable lights such as trouble lights adapted to be temporarily attached to any available support adjacent the part of an automobile or other thing which it is desired to illuminate, and aims generally to improve devices of this character, both as regards general utility and convenience and details of construction.

More particularly, my invention aims to provide an improved trouble light adapted to be attached to any smooth surface by means of a suction-cup embodied in the device, and to provide a device of the class described of simple and rugged construction and which shall be inexpensive to manufacture.

Referring to the accompanying drawing showing a preferred embodiment of trouble light illustrative of my invention:

Fig. 1 is a perspective view of the assembled light;

Fig. 2 is a central vertical section through the same;

Fig. 3 is a horizontal sectional view taken on the line 3—3 of Figure 2 looking in the direction of the arrows; and Fig. 4 is a fragmentary disassembled view of the body and reflector parts.

In the particular embodiment of my invention, selected for illustration herein, and which is particularly designed for use as an automobile trouble light, the lower end of the light comprises a mounting device preferably consisting of a suction cup 10 of rubber or other suitable material, which, when compressed against any smooth surface such as the body, fender, or other part of an automobile, or other structure, will firmly support the light thereon.

To this mounting device 10 is secured an assembly eyelet 11, shown as a tubular rivet with its closed head molded in place in the resilient material of the suction cup 10, which eyelet is employed to particular advantage, in the simple and efficient construction of my invention, to hold all of the base portions of my light in assembled position while at the same time providing electrical connection to, and forming at least a part of one of the contacts for the light bulb.

In the arrangement shown, one of the lighting circuit conductors 12 is provided with a perforated connector 13 closely fitting the eyelet 11 before any deformation thereof, and which is slipped over the eyelet as the first step in assembling the light, and forced on tight. Next the base portion 14, lamp socket shell 15 and one or more fibre washers 16 are successively positioned over the eyelet, the inner end of which is then turned back around the stem portion into engagement with the fibre washer 16, the flange 17 thereby formed serving to hold all of the parts in assembled relation, as is clearly indicated in Fig. 2.

The base member 14 of the body portion of my light is preferably formed of molded plastic composition which, as is well known, may be obtained in plain or motled colors and forms a substantially non-breakable, heat resistant, insulating construction cheap to manufacture and durable in use, and the use of which avoids any need for special insulation between the tubular rivet 11 and the body portion of the light, as would be necessary if a metal body were employed.

The lamp socket shell 15 may be of any desired form, that shown being of the bayonet joint type adapted to receive the standard single contact lamp 18 usually employed in automobile lighting systems, and is provided with an inturned flange 19 at its bottom end defining an orifice 20 of considerably larger diameter than the diameter of the eyelet 11. The fibre or other insulating washer 16 preferably is of such size as to abut the walls of the socket shell 15, overlying the flange 19 and closely fitting the tubular rivet 11, so that when the latter is formed into engagement with the washer 16 the entire structure will be firmly assembled together, and the shell 15 thereby held in insulating relation to the eyelet 11. Electrical connection from the lighting circuit may be made to the shell 15 in any suitable way as, for example, by a flexible insulated conductor having its exposed end 22 soldered to the shell 15 and passing through an orifice 23 formed in the molded base 14.

My construction is particularly advantageous in connection with the bayonet type socket shell as the tubular rivet 11 provides a seat or socket to receive a spiral contact spring 25 constituting a resilient contact for the center contact of the lamp 18, which spring 25 preferably has a tight fit with the tubular eyelet 11, to prevent its displacement after being forced into the same, thus avoiding the use of solder, although a soldered connection may be employed if desired.

It will be apparent that these features of my invention provide a simple, readily assembled, rugged and cheap construction for the base portion of my trouble light, which may be easily applied to and removed from any flat supporting surface.

In order to concentrate the light where most desirable and at the same time shield the eyes of the workman from the same, it is desirable to provide the light with a hood-member, but it is well known that the usual hooded light, while useful to illuminate the exact spot toward which the opening in its hood is directed, casts most of its illumination in an area too localized for maximum utility and convenience.

In accordance with my invention I overcome this objection by combining with the usual direct lighting aperture of a hooded lamp, a reflector positioned to indirectly light an area through the same aperture but outside of the zone illuminated directly, this provision of my construction being best shown in Fig. 2, in which the dotted lines A—A indicate generally the zone of direct illumination, while the dotted lines B—B indicate the zone illuminated by direct reflection of light from the reflector 31 hereinafter described. Thus provision is made for lighting the work zone with one of these areas of illumination while the other area thereof may fall upon the ground or other surface and facilitate the location and handling of tools or parts placed thereat.

In the form shown the hood shaped cover member 30 of the body of the light is preferably of molded composition like that of the base 14 and is mounted upon said base 14 in any suitable manner, while the reflector 31 is in the form of an apertured substantially flat plate of polished metal or molded composition extending radially adjacent the upper edge of the lamp socket 15. I have found that a plate of polished black bakelite is particularly satisfactory as a reflector due to the sharp angle of incidence and reflection from the member in the position shown, which insures a substantially complete reflection of the light even from a black surface.

In the preferred form of my invention the base 14, hooded cover member 30 and reflector 31 mutually hold one another in the assembled relation shown in Figs. 1 and 2 by virtue of a peculiar construction thereof, in which a portion of the periphery of the base 14, preferably a minor portion thereof corresponding to the extent of illumination aperture desired, is provided with an upstanding rim portion 32 shouldered to receive an edge of the reflector as at 33, and terminating in abutments 34 for cooperation with the hooded cover 30. The apertured reflector 31 is in turn provided with a portion 35 of relatively wide radial extent to fit into the shouldered seat 33, and with another portion 36 of relatively narrow radial extent designed to lie in spaced relation to the unrimmed portion of the base 14, as best indicated in Fig. 2. The hooded cover member 30 is in turn provided with a depending skirt portion 37 designed to slip into the space between the unrimmed periphery of said body base and the portion 36 of the reflector and to have close sliding contact with the base 14.

By reference to Figs. 1 and 3 it will be perceived that by rimming only a minor portion of the base 14 a major arc remains for this interengagement of the skirt 37 and base 14 and that engagement of the hooded cover with the shoulders 34 will further assist in holding the parts firmly in place and in preventing tipping of the hooded cover member.

Preferably these parts are so proportioned that as the hood-shaped cover is slipped into place it first contacts the reflector member to force it firmly into the shouldered seat 33, and in the form shown this result is obtained by making the area 35 of the reflector slightly greater in peripheral extent than the distance between the abutments 34 so that in sliding the hood shaped cover into place its edges bear against the portions 40 of the reflector member to force it tightly against its seat. Interengaging elements such as the extruded rib 41 and recess 42 upon the skirt 37 and base 14 are preferably employed to hold the cover and reflector in assembled relation after these members have been forced into place; and if the extruded rib 41 is made sufficiently small, say .005 inch in height, the usual molded composition can yield to a sufficient extent to enable interengaging of these parts.

In utilizing my improved trouble light, the lamp 18 is lighted by means of the conductors 12 and 21, which may be entwined and attached to a connector plug adapted to be plugged into a light socket of the vehicle as is well known; or which may be short and long, respectively, and provided with clamps of known construction to adapt them for connection to a live terminal and a frame-grounded portion of the vehicle electrical system. The suction cup 10, preferably moistened, may be pressed firmly against a smooth surface and so located as to project the main streams of light A—A and B—B to the areas to be illuminated. The light will remain firmly in position until removed by the application of a steady lateral pressure to cause lifting of one edge of the vacuum cup and admission of air therebeneath to free its hold.

I am aware that my invention is not restricted to the specific illustrative embodiment herein disclosed, and I therefore desire the disclosed embodiment to be considered in all respects as illustrative and not restrictive; reference being had to the appended claims rather than to the foregoing description to indicate the scope of my invention.

I claim:

1. A trouble light comprising, in combination, a suction cup, an assembly eyelet attached thereto and extending therefrom, a conductor electrically connected to said eyelet, a cup-shaped molded base assembled on said eyelet, a lamp-socket shell assembled over said eyelet within said cup-shaped base provided with an inwardly extending flange, an insulating washer assembled on said eyelet within said shell and overlying said flange and insulating said shell from said eyelet, said eyelet being formed into engagement with said washer and holding all said parts in assembled relation, a conductor connected to said shell, an upstanding shouldered rim extending from a part of the upper edge of said molded base, an internal recess below another part of the upper edge of said molded base, a hood-shaped molded cover member removably engaging with said molded base and having a protuberance engaging said internal recess, and a substantially flat apertured reflector having an edge engaged with said shouldered rim and a portion engaged by said cover member, and having its aperture aligned with said socket shell, said assembly providing for the hooded reception of a lamp in said socket shell with its bulb above said reflector.

2. The combination, in a trouble light, of a suction cup, an assembly eyelet attached thereto and extending therefrom, a conductor electrically connected to said eyelet, a molded base assembled on said eyelet, a lamp-socket shell assembled about said eyelet in said molded base and having an inwardly extending flange, an insulating washer assembled on said eyelet and overlying said flange and insulating said shell from said eyelet, said eyelet being formed into engagement with said washer and holding all said parts in assembled relation, and a second conductor electrically connected to said shell.

3. The combination, in a trouble light, of a suction cup, an assembly eyelet attached thereto and extending therefrom, a conductor electrically connected to said eyelet, a molded base assembled on said eyelet, a bayonet-type lamp-socket shell assembled about said eyelet in said molded base and having an inwardly extending flange, an insulating washer assembled on said eyelet and overlying said flange and insulating said shell from said eyelet, said eyelet being formed into engagement with said washer and holding all said parts in assembled relation, a second conductor electrically connected to said shell, and a resilient contact element electrically connected to said eyelet.

4. The combination, in a trouble light, of a mounting device, a tubular rivet attached thereto and extending therefrom, a conductor having a terminal slipped over said tubular rivet, a molded base likewise assembled on said rivet, a bayonet-type lamp-socket shell assembled about said rivet on said molded base and in non-contacting relation to said rivet, an insulating washer assembled on said rivet and retaining said shell in insulated relation to said rivet, said rivet being formed into retaining engagement with said washer and holding all said parts in assembled relation, a second conductor electrically connected to said shell, and a coil spring received within and extending above the top of said tubular rivet.

5. The combination, in a trouble light, of a mounting device, a cup-shaped body-base member carried thereby, an upstanding lamp socket arranged substantially centrally of said body-base, said body-base being provided about a minor portion of its periphery with an upstanding rim shouldered to provide a seat area and terminating in end abutments, a substantially flat apertured reflector surrounding said lamp-socket and having a minor portion of relatively wide radial extent fitting in said seat area and a major portion of relatively narrow radial extent spaced from the unrimmed periphery of said body-base, and a hood-shaped body-cover portion having a depending skirt portion formed to slip into the space adjacent the unrimmed periphery of said body-base and adapted to force said reflector into tight engagement in said seat area and to abut against the end abutments of said upstanding rim with a tight sliding fit preventing tipping of said cover.

6. The combination, in a trouble light, of a mounting device, a cup shaped body-base member carried thereby, an upstanding lamp-socket arranged substantially centrally of said body-base, said body-base being provided with a shouldered portion at a part of its upper edge, a substantially flat apertured reflector surrounding said lamp socket having a portion of relatively wide radial extent supported at said shouldered portion, a hood-shaped body-cover member engageable with the upper end of said body base member at that portion thereof opposite said shouldered portion and adapted to assist in holding said reflector in position, and means for releasably retaining said body members and reflector in interengaged position.

7. The combination in a device of the class described of a body member, a bayonet socket shell, an insulating washer, and a tubular rivet extending through said body member, through the bottom end of said socket shell in non-contacting relation therewith and into said insulating washer and formed into engagement with the latter, electrical connections to said socket shell and tubular rivet, and a spiral spring positioned within and extending above the top of said tubular rivet and having a force fit therein.

HAROLD S. CARLSON.